US012473932B2

(12) United States Patent
Takai

(10) Patent No.: US 12,473,932 B2
(45) Date of Patent: Nov. 18, 2025

(54) FLUID CIRCUIT FOR INTERMITTENT AIR DISCHARGE

(71) Applicant: SMC CORPORATION, Tokyo (JP)

(72) Inventor: Hidenori Takai, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 97 days.

(21) Appl. No.: 18/480,019

(22) Filed: Oct. 3, 2023

(65) Prior Publication Data

US 2024/0117822 A1 Apr. 11, 2024

(30) Foreign Application Priority Data

Oct. 7, 2022 (JP) ................................ 2022-162013

(51) Int. Cl.
*F15B 11/06* (2006.01)
*F15B 13/04* (2006.01)

(52) U.S. Cl.
CPC .......... *F15B 11/06* (2013.01); *F15B 13/0402* (2013.01); *F15B 2211/40515* (2013.01); *F15B 2211/8855* (2013.01)

(58) Field of Classification Search
CPC .. F15B 13/0402; F15B 13/0426; F15B 11/06; F15B 2211/885; F15B 2211/313; F15B 2211/405; F15B 21/12; F16K 11/07; F16K 31/122
See application file for complete search history.

(56) References Cited

U.S. PATENT DOCUMENTS

| | | | | |
|---|---|---|---|---|
| 6,109,291 | A * | 8/2000 | Yoshimura | F15B 13/043 137/854 |
| 7,735,518 | B2 * | 6/2010 | Williams | F15B 13/0426 137/596.15 |
| 2017/0343020 | A1 | 11/2017 | Matsumoto | |

FOREIGN PATENT DOCUMENTS

| | | |
|---|---|---|
| JP | 57-124602 U | 8/1982 |
| JP | 6289358 B2 | 3/2018 |

OTHER PUBLICATIONS

Japanese Office Action issued Dec. 17, 2024 in Japanese Patent Application No. 2022-162013 (with unedited computer-generated English translation). 9 pages.

* cited by examiner

*Primary Examiner* — Kelsey E Cary
(74) *Attorney, Agent, or Firm* — Oblon, McClelland, Maier & Neustadt, L.L.P.

(57) ABSTRACT

An intermittent air discharge fluid circuit includes a main valve including a discharge pilot chamber and a pilot valve including an air supply pilot chamber. The main valve is switched between a first position in which the air supply pilot chamber is connected to an air supply source and a discharge port is open to atmosphere, and a second position in which the air supply pilot chamber is open to atmosphere and the discharge port is connected to the air supply source. The pilot valve is switched between a first position in which the discharge pilot chamber is open to atmosphere and a second position in which the discharge pilot chamber is connected to the air supply source.

4 Claims, 7 Drawing Sheets

FLUID CIRCUIT FOR INTERMITTENT AIR DISCHARGE

CROSS-REFERENCE TO RELATED APPLICATIONS

This application is based upon and claims the benefit of priority from Japanese Patent Application No. 2022-162013 filed on Oct. 7, 2022, the contents of which are incorporated herein by reference.

BACKGROUND OF THE INVENTION

Field of the Invention

The present invention relates to a fluid circuit for intermittent air discharge, for intermittently discharging air such as compressed air.

Description of the Related Art

Heretofore, it is known that a fluid circuit including an air-operated main valve and an air-operated pilot valve is used in a device that intermittently discharges compressed air toward an object such as a workpiece.

For example, JP 6289358 B2 discloses an intermittent air discharge apparatus having a main valve for switching between a communication state and a shutoff state between an air supply port and a discharge port, and a pilot valve for switching between a state in which compressed air is supplied to a discharge pilot chamber of the main valve and a state in which compressed air is not supplied to the discharge pilot chamber. In this intermittent air discharge apparatus, compressed air supplied to the air supply port is supplied to the discharge pilot chamber of the main valve and the air supply stop pilot chamber of the pilot valve.

SUMMARY OF THE INVENTION

In the intermittent air discharge apparatus disclosed in JP 6289358 B2, since the compressed air supplied to the air supply port is simultaneously supplied to the pilot chamber of the main valve and the pilot chamber of the pilot valve, there is a possibility that the pilot valve may be switched before the main valve is switched. Further, since the compressed air supplied to the air supply port is discharged from the discharge port, there is a possibility that the compressed air that has undergone a pressure drop may be supplied to the pilot chamber of the main valve and the pilot chamber of the pilot valve. Due to these factors, the operations of the main valve and the pilot valve may become unstable, disadvantageously.

An object of the present invention is to solve the above-described problem.

According to an aspect of the present invention, there is provided an intermittent air discharge fluid circuit for intermittently discharging air from a discharge port of an air discharge device, the intermittent air discharge fluid circuit including: a main valve including a discharge pilot chamber; and a pilot valve including an air supply pilot chamber. The main valve is configured to be switched between a first position in which the air supply pilot chamber is connected to an air supply source and the discharge port is open to atmosphere, and a second position in which the air supply pilot chamber is open to atmosphere and the discharge port is connected to an air supply source. The pilot valve is configured to be switched between a first position in which the discharge pilot chamber is open to atmosphere and a second position in which the discharge pilot chamber is connected to an air supply source.

According to the intermittent air discharge fluid circuit of the present invention, the main valve cannot be switched until after the pilot valve is switched. Further, even if a pressure drop occurs due to the discharge of air, the pressure drop does not affect the operations of the pilot valve and the main valve. Therefore, it is possible to operate the main valve and the pilot valve stably.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

An intermittent air discharge fluid circuit (fluid circuit for intermittent air discharge) 10 according to a first embodiment of the present invention will be described with reference to FIGS. 1 to 4.

Figure 1:
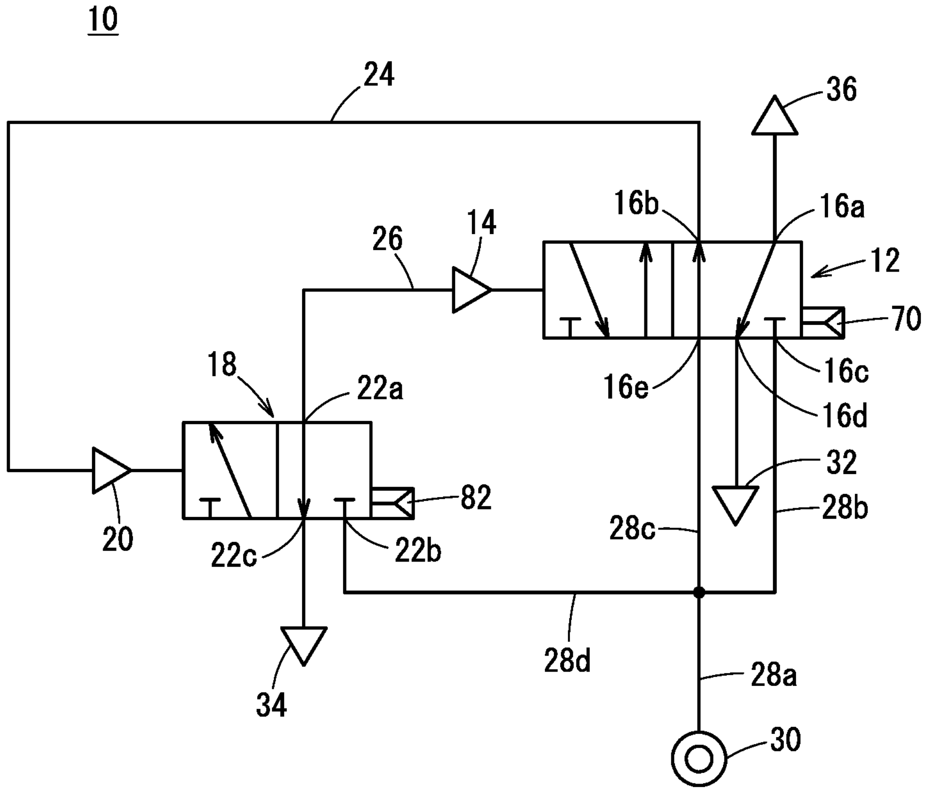
FIG. 1 is a diagram showing a fluid circuit for intermittent air discharge according to a first embodiment of the present invention.

As shown in FIG. 1, the intermittent air discharge fluid circuit 10 includes a main valve 12 including a discharge pilot chamber 14 and a pilot valve 18 including an air supply pilot chamber 20. The intermittent air discharge fluid circuit 10 is used in, for example, an air discharge device (not shown) that intermittently discharges air toward a workpiece to remove foreign matter such as dust attached to the workpiece.

A first connection flow path 24 and a second connection flow path 26 are disposed between the main valve 12 and the pilot valve 18. First to fourth air supply flow paths **28*a* to 28*d* are disposed between the main valve 12, the pilot valve 18, and an air supply source 30. One end of the first air supply flow path 28*a* is connected to the air supply source 30, and the other end of the first air supply flow path 28*a* is connected to the second air supply flow path 28*b*, the third air supply flow path 28*c***, and the fourth air supply flow path 28*d*. The second air supply flow path 28*b* and the third air supply flow path 28*c* are connected to the main valve 12. The fourth air supply flow path 28*d* is connected to the pilot valve 18.

The third air supply flow path 28*c* is a flow path for supplying air to the air supply pilot chamber 20 of the pilot valve 18. The fourth air supply flow path 28*d* is a flow path for supplying air to the discharge pilot chamber 14 of the main valve 12. One end of the first air supply flow path 28*a* is always connected to the air supply source 30, but may be connected to the air supply source 30 via a solenoid valve that switches between connection and disconnection with the air supply source 30.

The main valve 12 has first to fifth ports 16*a* to 16*e*. The first port 16*a* is connected to a discharge port 36 of the air discharge device. The second port 16*b* is connected to the air supply pilot chamber 20 of the pilot valve 18 via the first connection flow path 24. The third port 16*c* is connected to the air supply source 30 via the second air supply flow path 28*b* and the first air supply flow path 28*a*. The fourth port 16*d* is connected to a first exhaust port 32. The fifth port 16*e* is connected to the air supply source 30 via the third air supply flow path 28*c* and the first air supply flow path 28*a*.

The main valve 12 is switched between a first position and a second position. When the main valve 12 is in the first position, the first port 16*a* and the fourth port 16*d* communicate with each other, and the second port 16*b* and the fifth port 16*e* communicate with each other (see FIGS. 1 and 2). When the main valve 12 is in the second position, the first port 16*a* and the third port 16*c* communicate with each other, and the second port 16*b* and the fourth port 16*d* communicate with each other (see FIGS. 3 and 4).

The main valve 12 switches to the first position when the air in the discharge pilot chamber 14 is discharged, and switches to the second position when the air is supplied to the discharge pilot chamber 14. When the main valve 12 is in the first position, the air supply pilot chamber 20 of the pilot valve 18 is connected to the air supply source 30, and the discharge port 36 is opened to the atmosphere through the first exhaust port 32. When the main valve 12 is in the second position, the air supply pilot chamber 20 of the pilot valve 18 is opened to the atmosphere through the first exhaust port 32, and the discharge port 36 is connected to the air supply source 30.

The pilot valve 18 has first to third ports 22*a* to 22*c*. The first port 22*a* is connected to the discharge pilot chamber 14 of the main valve 12 via the second connection flow path 26. The second port 22*b* is connected to the air supply source 30 via the fourth air supply flow path 28*d* and the first air supply flow path 28*a*. The third port 22*c* is connected to the second exhaust port 34.

The pilot valve 18 is switched between a first position and a second position. When the pilot valve 18 is in the first position, the first port 22*a* and the third port 22*c* communicate with each other, and communication between the first port 22*a* and the second port 22*b* is blocked (see FIGS. 1 and 4). When the pilot valve 18 is in the second position, the first port 22*a* and the second port 22*b* communicate with each other, and communication between the first port 22*a* and the third port 22*c* is blocked (see FIGS. 2 and 3).

The pilot valve 18 is switched to the first position when air in the air supply pilot chamber 20 is discharged, and is switched to the second position when air is supplied to the air supply pilot chamber 20. When the pilot valve 18 is in the first position, the discharge pilot chamber 14 of the main valve 12 is opened to the atmosphere through a second exhaust port 34. When the pilot valve 18 is in the second position, the discharge pilot chamber 14 of the main valve 12 is connected to the air supply source 30.

Reference numeral 70 denotes an air chamber for applying an air pressure against the discharge pilot chamber 14, and reference numeral 82 denotes a pilot air chamber for applying an air pressure against the air supply pilot chamber 20. Air is supplied from the air supply source 30 to the air chamber 70 and the pilot air chamber 82, regardless of the switching positions of the main valve 12 and the pilot valve 18.

Next, the operation of the intermittent air discharge fluid circuit 10 will be described. As shown in FIG. 1, a state in which the main valve 12 is at the first position and the pilot valve 18 is at the first position is an initial state. It is assumed that one end of the first air supply flow path 28*a* is always connected to the air supply source 30. In an initial state, operation of the air supply source 30 is stopped.

Figure 2:
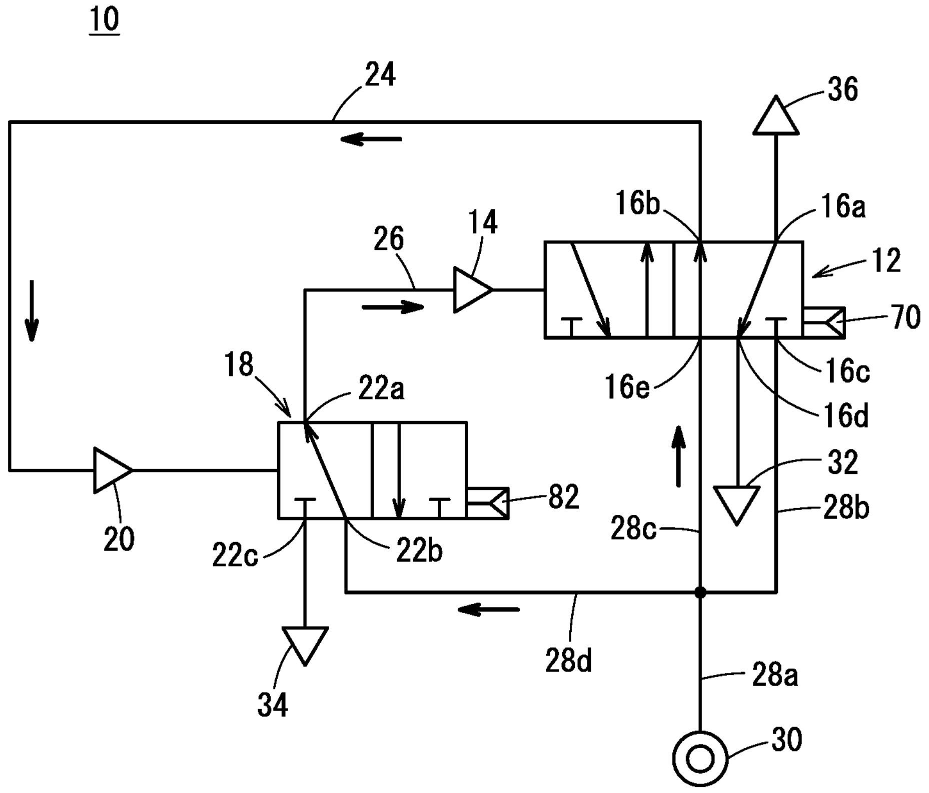
FIG. 2 is a diagram showing a state in which a pilot valve is switched in the intermittent air discharge fluid circuit of FIG. 1.

When the air supply source 30 starts operating, air from the air supply source 30 is supplied to the air supply pilot chamber 20 of the pilot valve 18 via the first air supply flow path 28*a*, the third air supply flow path 28*c*, the main valve 12, and the first connection flow path 24. As a result, as shown in FIG. 2, the pilot valve 18 is switched from the first position to the second position. In a case where one end of the first air supply flow path 28*a* is connected to the air supply source 30 via the solenoid valve, on the assumption that the air supply source 30 is in operation, "the air supply source 30 starts operating" is read as "the solenoid valve is switched to an open position to connect the first air supply flow path 28*a* to the air supply source 30".

Figure 3:
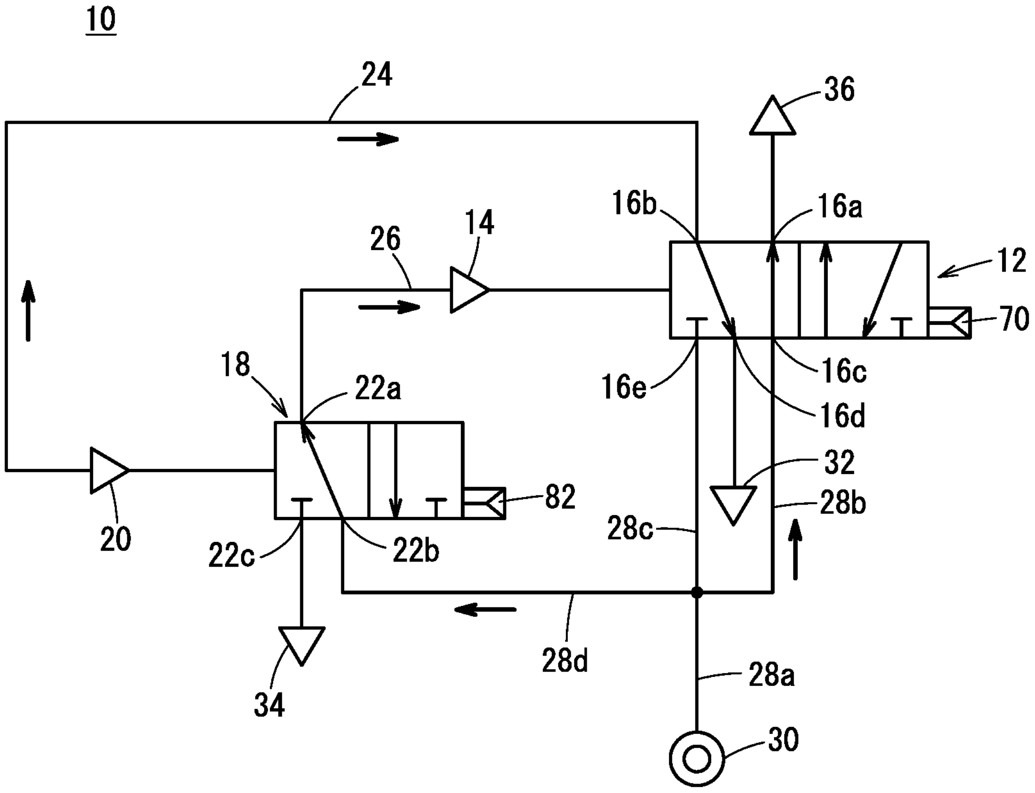
FIG. 3 is a view showing a state in which a main valve is switched in the intermittent air discharge fluid circuit of FIG. 2.

When the pilot valve 18 is switched to the second position, air from the air supply source 30 is supplied to the discharge pilot chamber 14 of the main valve 12 via the first air supply flow path 28*a*, the fourth air supply flow path 28*d*, the pilot valve 18, and the second connection flow path 26. As a result, as shown in FIG. 3, the main valve 12 is switched from the first position to the second position.

Figure 4:
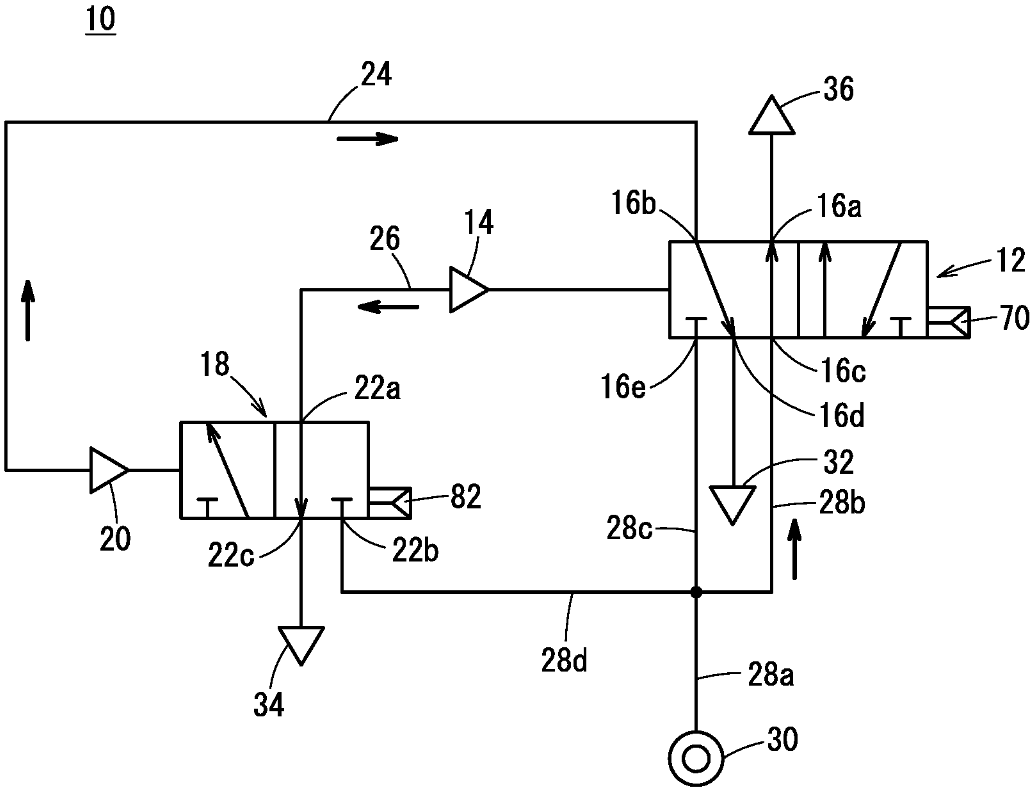
FIG. 4 is a diagram showing a state in which the pilot valve is switched in the intermittent air discharge fluid circuit of FIG. 3.

When the main valve 12 is switched to the second position, air from the air supply source 30 is discharged from the discharge port 36 through the first air supply flow path 28*a*, the second air supply flow path 28*b*, and the main valve 12. At the same time, air in the air supply pilot chamber 20 of the pilot valve 18 is discharged from the first exhaust port 32 via the first connection flow path 24 and the main valve 12. As a result, as shown in FIG. 4, the pilot valve 18 is switched from the second position to the first position.

When the pilot valve 18 is switched to the first position, air in the discharge pilot chamber 14 of the main valve 12 is discharged from the second exhaust port 34 via the second connection flow path 26 and the pilot valve 18. As a result, as shown in FIG. 1, the main valve 12 is switched from the second position to the first position. While the air supply source 30 is in operation, the above-described series of actions is periodically repeated, and air is intermittently discharged from the discharge port 36. When the one end of the first air supply flow path 28*a* is connected to the air supply source 30 via the solenoid valve, "while the air supply source 30 is in operation" is read as "while the solenoid valve is at the open position".

According to the intermittent air discharge fluid circuit 10 of the present embodiment, the main valve 12 at the first position is not switched to the second position until after the pilot valve 18 is switched from the first position to the second position. Further, the main valve 12 at the second position is not switched to the first position until after the pilot valve 18 is switched from the second position to the first position. Therefore, stable operation of the main valve 12 is ensured.

After the main valve 12 is switched to the first position, air from the air supply source 30 is not discharged from the discharge port 36 when the air is supplied to the air supply pilot chamber 20 of the pilot valve 18 and the discharge pilot chamber 14 of the main valve 12. Therefore, no pressure drop occurs in the air supplied to the air supply pilot chamber 20 of the pilot valve 18 and the discharge pilot chamber 14 of the main valve 12.

On the other hand, after the main valve 12 is switched to the second position, air from the air supply source 30 is discharged from the discharge port 36 and is also supplied to the pilot air chamber 82 of the pilot valve 18 and the air chamber 70 of the main valve 12. At this time, there is a possibility that the air subjected to the pressure drop is supplied to the pilot air chamber 82 and the air chamber 70, but it is considered that the influence of the pressure drop on the next switching (switching from the second position to the first position) is extremely small. This is because when the air in the air supply pilot chamber 20 of the pilot valve 18 and the air discharge pilot chamber 14 of the main valve 12 is discharged to be in the atmosphere open state, there is almost no residual pressure that urges the pilot valve 18 and the main valve 12 to the second position. Since there is almost no residual pressure, when air is supplied to the pilot air chamber 82 and the air chamber 70, the main valve 12 and the pilot valve 18 are reliably switched to the first position. As described above, stable operations of the main valve 12 and the pilot valve 18 are ensured.

In the embodiment described above, air from the air supply source 30 is used to switch the main valve 12 and the pilot valve 18 from the second position to the first position. Alternatively, a biasing member such as a spring or a combination of air and spring may be utilized. In that case, the influence of the pressure drop can be further eliminated.

Second Embodiment

Figure 5:
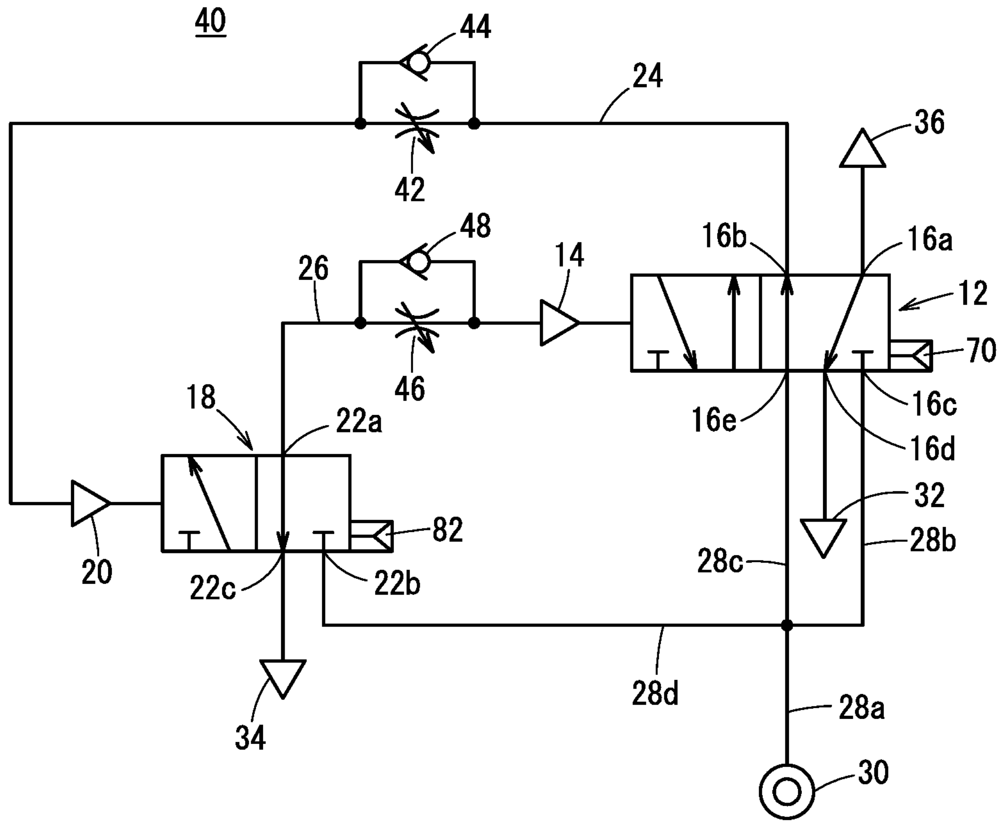
FIG. 5 is a diagram showing a fluid circuit for intermittent air discharge according to a second embodiment of the present invention.

Next, an intermittent air discharge fluid circuit 40 according to a second embodiment of the present invention will be described with reference to FIG. 5. The intermittent air discharge fluid circuit 40 according to the second embodiment differs from the intermittent air discharge fluid circuit 10 according to the first embodiment in that a circuit for adjusting the frequency of operation of each of the main valve 12 and the pilot valve 18 is added. Constituent elements that are the same as or equivalent to those of the intermittent air discharge fluid circuit 10 according to the first embodiment are denoted by the same reference numerals, and detailed description thereof is omitted.

A first variable throttle valve 42 is arranged at a position on the first connection flow path 24. A first check valve 44 is arranged in a flow path bypassing the first variable throttle valve 42. That is, the first check valve 44 is arranged in parallel with the first variable throttle valve 42. The first check valve 44 allows air to flow from the air supply pilot chamber 20 of the pilot valve 18 toward the second port 16*b* of the main valve 12, and blocks flow of air from the second port 16*b* of the main valve 12 toward the air supply pilot chamber 20 of the pilot valve 18. Therefore, the flow rate of air supplied from the air supply source 30 to the air supply pilot chamber 20 of the pilot valve 18 is limited in accordance with the flow path area set by the first variable throttle valve 42.

A second variable throttle valve 46 is disposed at a position on the second connection flow path 26. A second check valve 48 is disposed in a flow path bypassing the second variable throttle valve 46. That is, the second check valve 48 is arranged in parallel with the second variable throttle valve 46. The second check valve 48 allows air to flow from the first port 22*a* of the pilot valve 18 toward the discharge pilot chamber 14 of the main valve 12, and blocks flow of air from the discharge pilot chamber 14 of the main valve 12 toward the first port 22*a* of the pilot valve 18. Therefore, the flow rate of the air discharged from the discharge pilot chamber 14 of the main valve 12 toward the second exhaust port 34 is limited in accordance with the flow path area set by the second variable throttle valve 46.

As the flow rate of the air supplied to the air supply pilot chamber 20 decreases, the pressure rise rate of the air supply pilot chamber 20 decreases. The time (T1) from when the main valve 12 is switched to the first position to when the pilot valve 18 is switched to the second position increases accordingly. The smaller the flow rate of the air discharged from the discharge pilot chamber 14, the longer the time (T2) from the switching of the pilot valve 18 to the first position to the switching of the main valve 12 to the first position.

The longer the T1 and the T2, the less frequently the main and pilot valves 12, 18 operate. Since the T1 is included in a time period during which air is not discharged from the discharge port 36, the longer the T1 is, the smaller the flow rate of air discharged from the discharge port 36 is. On the other hand, since the T2 is included in a time period during which air is discharged from the discharge port 36, the longer the T2 is, the larger the flow rate of the air discharged from the discharge port 36 is. In order to increase the flow rate of the air discharged from the discharge port 36, the T1 may be shortened and the T2 may be lengthened. In other words, in order to increase the flow rate of the air discharged from the discharge port 36, the flow path area set by the first variable throttle valve 42 may be increased and the flow path area set by the second variable throttle valve 46 may be decreased.

According to the intermittent air discharge fluid circuit 40 of the present embodiment, the frequency in operation of the main valve 12 and the pilot valve 18 can be adjusted, and the flow rate of the air discharged from the discharge port 36 can be adjusted.

Figure 7:
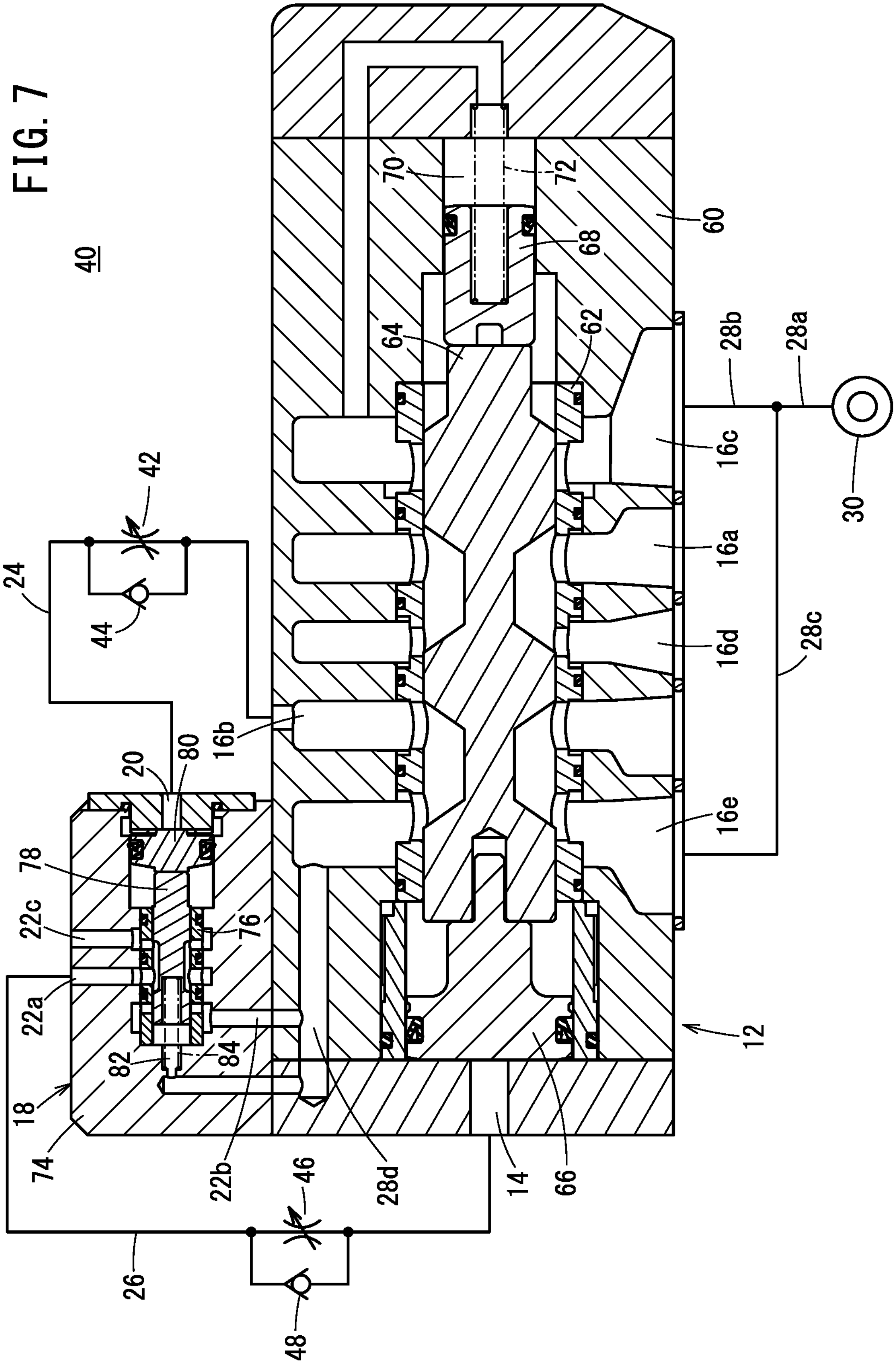
FIG. 7 is a diagram showing a specific structural example of the main valve and the pilot valve of the present invention.

A specific structural example of the main valve 12 and the pilot valve 18 is shown in FIG. 7. The main valve 12 includes a body 60, a sleeve 62, and a spool 64. The pilot valve 18 includes a pilot body 74, a pilot sleeve 76, and a pilot spool 78.

The body 60 includes the first to fifth ports 16*a* to 16*e*. The sleeve 62 is fixed inside the body 60. As the spool 64 slides inside the sleeve 62, the connection relationship between the first to fifth ports 16*a* to 16*e* changes. As shown in FIG. 7, when the spool 64 is at the leftward moving end, the first port 16*a* and the fourth port 16*d* communicate with each other, and the second port 16*b* and the fifth port 16*e* communicate with each other. That is, FIG. 7 shows the main valve 12 is in the first position. When the spool 64 moves to the right, the first port 16*a* and the third port 16*c* communicate with each other, and the second port 16*b* and the fourth port 16*d* communicate with each other. That is, the main valve 12 is switched to the second position.

A first piston 66 abuts against the left end of the spool 64. The discharge pilot chamber 14 is formed on the left side of the first piston 66. A second piston 68 abuts against the right end of the spool 64. An air chamber 70 communicating with the third port 16*c* is formed on the right side of the second piston 68. A spring 72 for urging the second piston 68 leftward is disposed in the air chamber 70.

The pilot body 74 includes the first to third ports 22*a* to 22*c*. The pilot sleeve 76 is fixed inside the pilot body 74. As the pilot spool 78 slides inside the pilot sleeve 76, the connection relationship between the first to third ports 22*a* to 22*c* changes. As shown in FIG. 7, when the pilot spool 78 is located at the right moving end, the first port 22*a* and the third port 22*c* communicate with each other. That is, FIG. 7 shows that the pilot valve 18 is in the first position. When the pilot spool 78 moves leftward, the first port 22*a* and the second port 22*b* communicate with each other, and the pilot valve 18 is switched to the second position.

A pilot piston 80 abuts against the right end of the pilot spool 78. The air supply pilot chamber 20 is formed on the right side of the pilot piston 80. A pilot air chamber 82 communicating with the second port 22*b* is formed on the left side of the pilot spool 78. A pilot spring 84 that urges the pilot spool 78 rightward is disposed in the pilot air chamber 82. Note that the spring 72 and the pilot spring 84 are not necessarily required members.

The structural example shown in FIG. 7 can also be applied to the intermittent air discharge fluid circuit 10 according to the first embodiment and an intermittent air discharge fluid circuit 50 according to a third embodiment described later. In the structure example shown in FIG. 7, the second port 22*b* of the pilot valve 18 is connected to the air supply source 30 via the fourth air supply flow path 28*d* and the third air supply flow path 28*c*.

Third Embodiment

Figure 6:
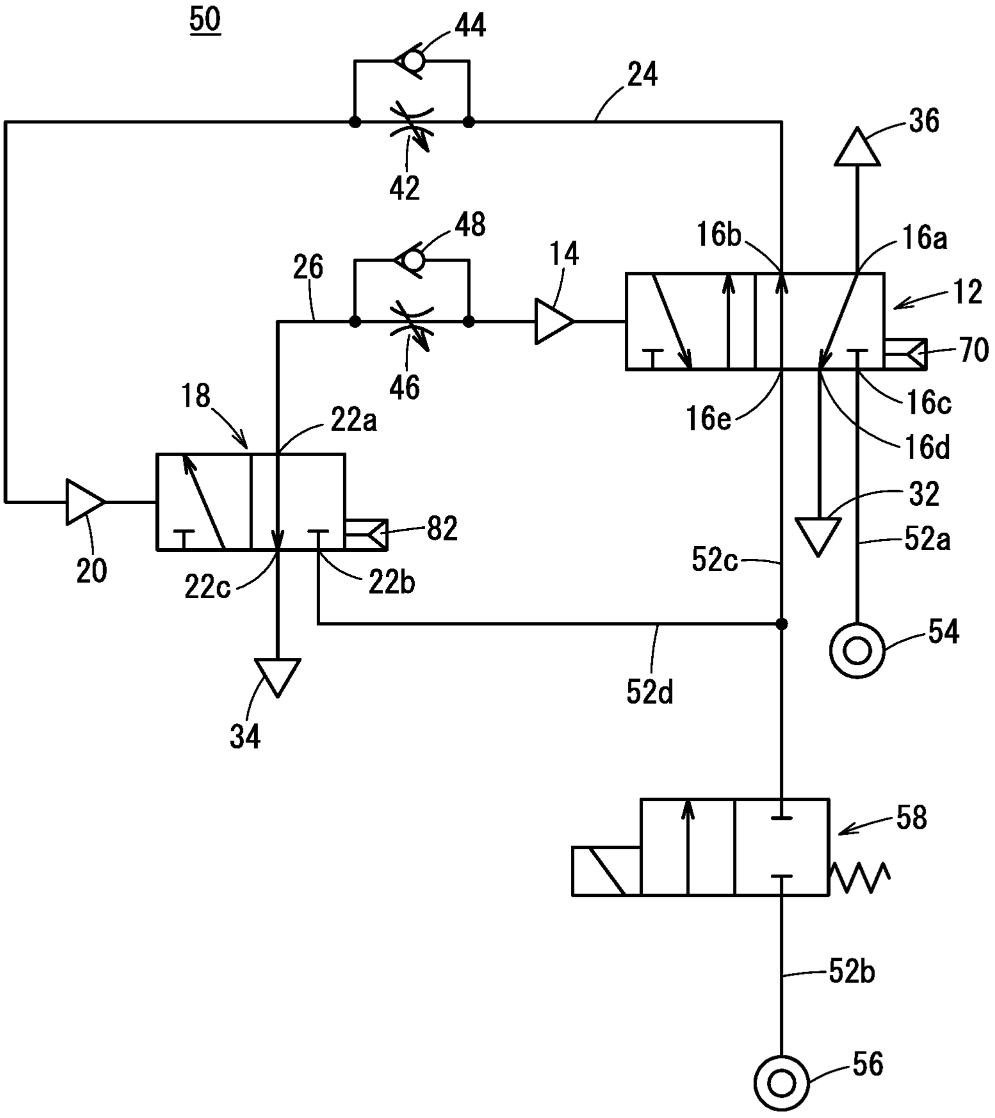
FIG. 6 is a view showing a fluid circuit for intermittent air discharge according to a third embodiment of the present invention.

Next, an intermittent air discharge fluid circuit 50 according to a third embodiment of the present invention will be described with reference to FIG. 6. The intermittent air discharge fluid circuit 50 according to the third embodiment is different from the intermittent air discharge fluid circuit 40 according to the second embodiment in that a first air supply source 54 connected to the main valve 12 and a second air supply source 56 connected to the main valve 12 and the pilot valve 18 are provided. In addition, the intermittent air discharge fluid circuit 50 according to the third embodiment differs from the intermittent air discharge fluid circuit 40 according to the second embodiment in that an external pilot valve 58 is provided. The same or equivalent components as those of the intermittent air discharge fluid circuit 40 according to the second embodiment are denoted by the same reference numerals.

A first connection flow path 24 and a second connection flow path 26 are disposed between the main valve 12 and the pilot valve 18. A first air supply flow path 52*a* is disposed between the main valve 12 and the first air supply source 54. The first air supply flow path 52*a* is constantly connected to the first air supply source 54. A second air supply flow path 52*b*, a third air supply flow path 52*c*, and a fourth air supply flow path 52*d* are disposed between the main valve 12, the pilot valve 18, and the second air supply source 56. One end of the second air supply flow path 52*b* is connected to the second air supply source 56, and the other end of the second air supply flow path 52*b* is connected to the third air supply flow path 52*c* and the fourth air supply flow path 52*d*. The third air supply flow path 52*c* is connected to the main valve 12. The fourth air supply flow path 52*d* is connected to the pilot valve 18. The external pilot valve 58 is disposed at a position on the second air supply flow path 52*b*.

The main valve 12 has first to fifth ports 16*a* to 16*e*. The first port 16*a* is connected to a discharge port 36. The second port 16*b* is connected to the air supply pilot chamber 20 of the pilot valve 18 via the first connection flow path 24. The third port 16*c* is connected to the first air supply source 54 via the first air supply flow path 52*a*. The fourth port 16*d* is connected to a first exhaust port 32. The fifth port 16*e* is connected to the second air supply source 56 via the third air supply flow path 52*c* and the second air supply flow path 52*b*.

The pilot valve 18 has first to third ports 22*a* to 22*c*. The first port 22*a* is connected to the discharge pilot chamber 14 of the main valve 12 via the second connection flow path 26. The second port 22*b* is connected to the second air supply source 56 via the fourth air supply flow path 52*d* and the second air supply flow path 52*b*. The third port 22*c* is connected to the second exhaust port 34.

The main valve 12 is switched between a first position and a second position. When the main valve 12 is in the first position, the first port 16*a* and the fourth port 16*d* communicate with each other, and the second port 16*b* and the fifth port 16*e* communicate with each other. When the main valve 12 is in the second position, the first port 16*a* and the third port 16*c* communicate with each other, and the second port 16*b* and the fourth port 16*d* communicate with each other.

The main valve 12 switches to the first position when the air in the discharge pilot chamber 14 is discharged, and switches to the second position when the air is supplied to the discharge pilot chamber 14. When the main valve 12 is in the first position, the air supply pilot chamber 20 of the pilot valve 18 is connected to the second air supply source 56 via the external pilot valve 58, and the discharge port 36 is opened to the atmosphere through the first exhaust port 32. When the main valve 12 is in the second position, the air supply pilot chamber 20 of the pilot valve 18 is opened to the atmosphere through the first exhaust port 32, and the discharge port 36 is connected to the first air supply source 54.

The pilot valve 18 is switched between a first position and a second position. When the pilot valve 18 is in the first position, the first port 22*a* and the third port 22*c* communicate with each other, and the communication between the first port 22*a* and the second port 22*b* is blocked. When the pilot valve 18 is in the second position, the first port 22*a* and the second port 22*b* communicate with each other, and the communication between the first port 22*a* and the third port 22*c* is blocked.

The external pilot valve 58 is configured as a two port valve and is switched between a closed position and an open position. When the external pilot valve 58 is in the open position, the second air supply source 56 is connected to the fifth port 16*e* of the main valve 12 and the second port 22*b* of the pilot valve 18. When the external pilot valve 58 is in the closed position, the connection between the second air supply source 56 and the fifth port 16*e* of the main valve 12 is blocked, and the connection between the second air supply source 56 and the second port 22*b* of the pilot valve 18 is blocked. The external pilot valve 58 controls the start and stop of the discharge operation of air from the discharge port 36.

The pilot valve 18 is switched to the first position when air in the air supply pilot chamber 20 is discharged, and is switched to the second position when air is supplied to the air supply pilot chamber 20. When the pilot valve 18 is in the first position, the discharge pilot chamber 14 of the main valve 12 is opened to the atmosphere through the second exhaust port 34. When the pilot valve 18 is in the second position and the external pilot valve 58 is in the open position, the discharge pilot chamber 14 of the main valve 12 is connected to the second air supply source 56.

Next, the operation of the intermittent air discharge fluid circuit 50 will be described. In an initial state, the first air supply source 54 and the second air supply source 56 are in operation, and the external pilot valve 58 is in the closed position. The main valve 12 is in the first position, and the pilot valve 18 is in the first position. Air is not discharged from the discharge port 36.

When the external pilot valve 58 is in the open position, air from the second air supply source 56 is supplied to the air supply pilot chamber 20 of the pilot valve 18 via the second air supply flow path 52*b*, the third air supply flow path 52*c*, the main valve 12, and the first connection flow path 24. As a result, the pilot valve 18 is switched from the first position to the second position.

When the pilot valve 18 is switched to the second position, air from the second air supply source 56 is supplied to the discharge pilot chamber 14 of the main valve 12 through the second air supply flow path 52*b*, the fourth air supply flow path 52*d*, the pilot valve 18, and the second connection flow path 26. As a result, the main valve 12 is switched from the first position to the second position.

When the main valve 12 is switched to the second position, air from the first air supply source 54 is discharged from the discharge port 36 via the first air supply flow path 52*a* and the main valve 12. At the same time, air in the air supply pilot chamber 20 of the pilot valve 18 is discharged from the first exhaust port 32 via the first connection flow path 24 and the main valve 12. Thus, the pilot valve 18 is switched from the second position to the first position.

When the pilot valve 18 is switched to the first position, air in the discharge pilot chamber 14 of the main valve 12 is discharged from the second exhaust port 34 via the second connection flow path 26 and the pilot valve 18. As a result, the main valve 12 is switched from the second position to the first position. While the external pilot valve 58 is in the open position, the above-described operation is periodically repeated, and air is intermittently discharged from the discharge port 36.

When the external pilot valve 58 is switched to the closed position, the supply of air to the second port 22*b* of the pilot valve 18 is stopped. Therefore, when the pilot valve 18 is in the second position, the supply of air to the discharge pilot chamber 14 of the main valve 12 is stopped. When the supply of air to the discharge pilot chamber 14 of the main valve 12 is stopped, in a case where the main valve 12 is at the second position and air is discharged from the discharge port 36, the discharge of air from the air supply pilot chamber 20 of the pilot valve 18 proceeds and the pilot valve 18 is switched to the first position.

When the pilot valve 18 is switched to the first position, the air in the discharge pilot chamber 14 of the main valve 12 is quickly discharged, the main valve 12 is switched to the first position, and the discharge of air from the discharge port 36 is stopped. Thereafter, since no air is supplied to the discharge pilot chamber 14 of the main valve 12, a state in which no air is discharged from the discharge port 36 is reliably maintained.

According to the intermittent air discharge fluid circuit 50 of the present embodiment, it is possible to determine the flow rate of air discharged from the discharge port 36, based on the capability of the first air supply source 54. Further, it is possible to determine the flow rate of air supplied to the discharge pilot chamber 14 of the main valve 12 and the flow rate of air supplied to the air supply pilot chamber 20 of the pilot valve 18, based on the capability of the second air supply source 56. Therefore, it is useful for discharging a large amount of air from the discharge port 36.

The present invention is not limited to the embodiments described above, but various configurations can be adopted therein without deviating from the essence and gist of the present invention.

The invention claimed is:

1. An intermittent air discharge fluid circuit for intermittently discharging air from a discharge port of an air discharge device toward a workpiece, the intermittent air discharge fluid circuit comprising:

a main valve including a discharge pilot chamber; and a pilot valve including an air supply pilot chamber, wherein the discharge port is connected to a first air supply source, and the air supply pilot chamber and the discharge pilot chamber are connected to a second air supply source, the main valve is configured to be switched between a first position in which the air supply pilot chamber is connected to the second air supply source and the discharge port is open to atmosphere, and a second position in which the air supply pilot chamber is open to atmosphere and the discharge port is connected to the first air supply source, and the pilot valve is configured to be switched between a first position in which the discharge pilot chamber is open to atmosphere and a second position in which the discharge pilot chamber is connected to the second air supply source.

2. The intermittent air discharge fluid circuit according to claim 1, wherein a first throttle valve is disposed in a flow path connecting the air supply pilot chamber and the main valve, and a second throttle valve is disposed in a flow path connecting the discharge pilot chamber and the pilot valve.

3. The intermittent air discharge fluid circuit according to claim 2, wherein a first check valve is arranged in parallel with the first throttle valve, and a second check valve is arranged in parallel with the second throttle valve.

4. The intermittent air discharge fluid circuit according to claim 1, wherein the air supply pilot chamber and the discharge pilot chamber are connected to the second air supply source via an external pilot valve.

* * * * *